United States Patent [19]
McKay et al.

[11] Patent Number: 5,239,497
[45] Date of Patent: Aug. 24, 1993

[54] FAST PATTERN CORRELATOR AND METHOD

[75] Inventors: Brent M. McKay, Mesa; Carl A. Grube, Scottsdale; William R. Worger, Mesa, all of Ariz.

[73] Assignee: Motorola, Inc., Schaumburg, Ill.

[21] Appl. No.: 769,662

[22] Filed: Oct. 2, 1991

[51] Int. Cl.⁵ ............................................. G06F 15/336
[52] U.S. Cl. ............................. 364/728.03; 364/715.11
[58] Field of Search ........................ 364/715.11, 728.03

[56] References Cited

U.S. PATENT DOCUMENTS

| | | | |
|---|---|---|---|
| 4,734,676 | 3/1988 | Huon et al. | 364/715.11 |
| 4,829,462 | 5/1989 | Freeman et al. | 364/715.11 |
| 4,847,877 | 7/1989 | Besseyre | 364/715.11 |
| 5,016,206 | 5/1991 | Shinonaga | 364/728.03 |
| 5,122,778 | 6/1992 | Erhart et al. | 364/715.11 |

Primary Examiner—David H. Malzahn
Attorney, Agent, or Firm—Jeffrey D. Nehr

[57] ABSTRACT

A fast pattern correlator and method comprising received bitstream data blocks split into estimation blocks and correlation blocks. Correlation blocks are extracted and compared to an expected pattern using a correlation part starting location estimator and correlator. The number of bit errors resulting is compared to a predetermined maximum in a threshold comparator. Extracting the correlation blocks includes indexing consecutive estimation blocks using an estimation part correlation table and predicting consistent correlation block starting locations. The correlation blocks are correlated with the expected pattern to produce an exclusive-OR result, which, used with a bit-error table, can be used to find a number of bit errors in the correlation.

18 Claims, 3 Drawing Sheets

FAST PATTERN CORRELATOR AND METHOD

BACKGROUND OF THE INVENTION

This invention relates in general to the field of data correlation, and in particular to fast correlation of data in a received bit stream.

In communication receivers and pattern recognition systems, there is a general need for correlation of a pattern of received data with an expected pattern. As a particular example, a telephone with secure mode capability may be switched from voice to data modes upon receipt of appropriate data. A particular data bit stream correlated to an expected pattern may be used to signal the telephone to accept the appropriate data to change modes.

Traditional approaches to pattern recognition and correlation involve either hardware or software. Both methods essentially involve a bit-by-bit comparison of the received bit stream with the expected pattern, counting the number of bit errors resulting. Before an actual correlation can be made, however, the comparator must find the beginning of the received pattern. The beginning bit of the received bitstream pattern may be discernible by virtue of the communication mode employed, but, in many cases, the beginning bit of the received bitstream pattern to be correlated must be determined by the pattern correlator and correlation method.

Bit by bit comparison methods to correlate a received pattern to an expected pattern typically suffer the disadvantage of requiring a large number of components, if the correlation is done in hardware, or the disadvantage of relative slowness, if the correlation is accomplished in software. Software correlators are also not often readily adaptable to 8-bit, 16-bit, and 32-bit processors. Such "brute force" methods, in addition, do not take advantage if the bitstream data pattern to be correlated forms unique blocks.

Thus, it would be desirable to have a fast pattern correlator and method which does not require a relatively large number of components in hardware and which also requires a correlation of only a portion of an entire data bitstream pattern, thereby speeding up the correlation process. It would be additionally desirable to have such a correlator and method which is well suited for software implementations in bit lengths which a processor can handle efficiently (e.g., 8-bit, 16-bit, or 32-bit pieces). It would also be desirable to have a correlator and method which will detect a pattern even in the presence of bit errors.

SUMMARY OF THE INVENTION

Accordingly, it is an advantage of the present invention to provide a new and improved fast pattern correlator and method for correlating a pattern in a received bit stream. It is also an advantage of the present invention to provide such correlation even in the presence of bit errors. It is a further advantage of the present invention to correlate a pattern based on a portion of the entire bitstream pattern, in a system which is suitable for software implementations using different processors.

To achieve these advantages, a fast pattern correlator and method are contemplated which comprise receiving bitstream data blocks which are split into estimation blocks and correlation blocks. The correlation blocks are extracted from the bitstream data blocks and compared to an expected pattern using a correlation part starting location estimator and a correlator. The comparison generates the number of bit errors between the correlation blocks and the expected pattern. The number of bit errors is compared to a predetermined maximum in a threshold comparator to verify correlation.

The step of extracting the correlation blocks includes receiving incoming bitstream data blocks, indexing an estimation block using an estimation part correlation table, and predicting a correlation block location from the estimation part correlation table. A communications system can be made part of the correlation system and method.

Consecutive estimation blocks are similarly used to generate predictions of the first correlation block location until a predetermined minimum number of consistent correlation block locations have been predicted.

After counting through the estimation blocks to the correlation blocks, the correlation blocks are correlated with the expected pattern to produce an exclusive-OR result. The exclusive-OR function, used with a bit-error table, can be used to find a number of bit errors in the correlation.

The above and other features and advantages of the present invention will be better understood from the following detailed description taken in conjunction with the accompanying drawings.

DETAILED DESCRIPTION OF THE PREFERRED EMBODIMENT

Figure 1:
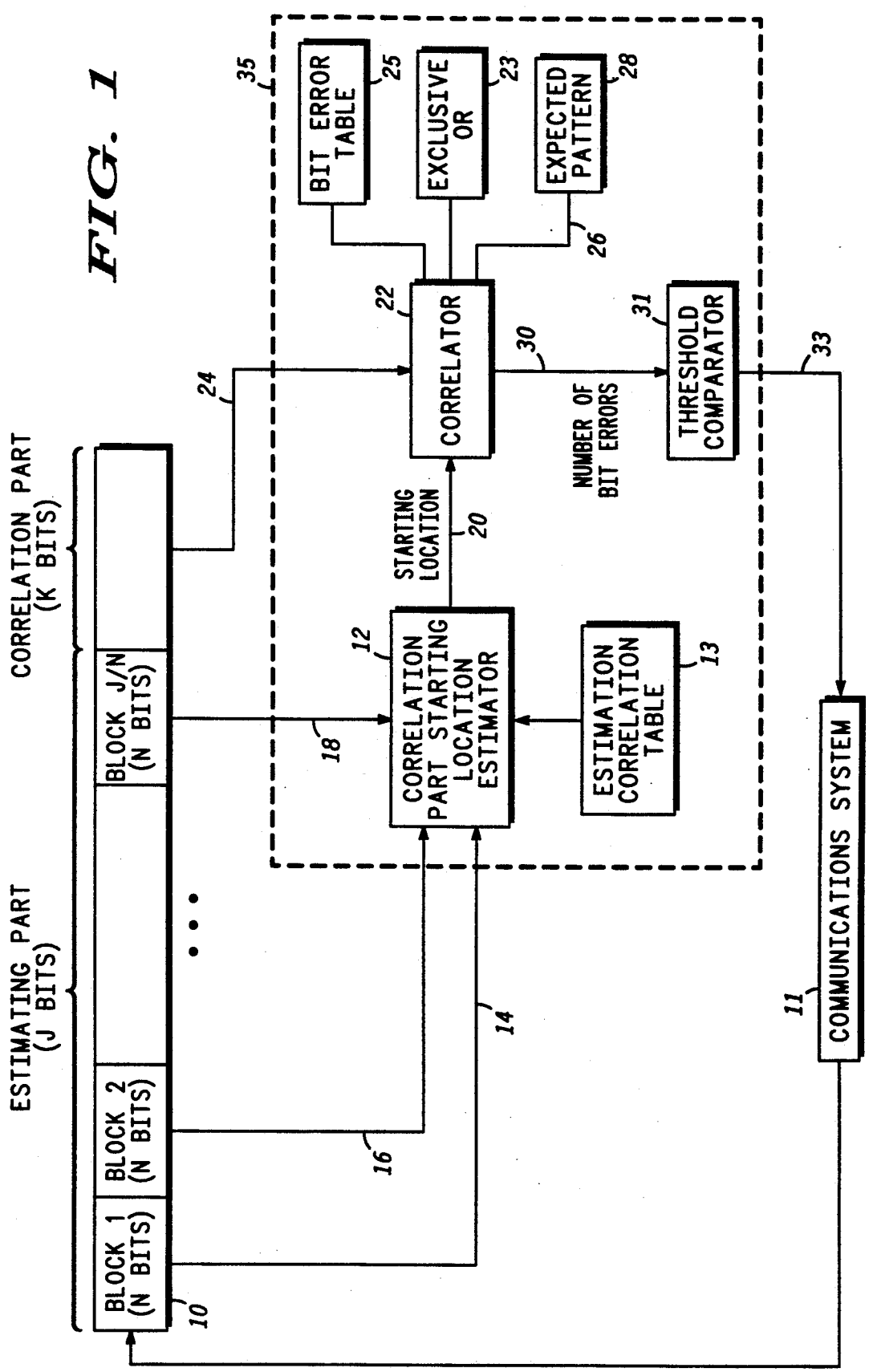
In FIG. 1, there is shown a schematic diagram of a fast pattern correlation system in accordance with a preferred embodiment of the invention.

FIG. 1 illustrates schematically a fast pattern correlation system in accordance with a preferred embodiment of the invention. Major components include the correlation part starting location estimator 12, correlator 22, threshold comparator 31, and communications system 11. The correlator 22 is coupled between the correlation part starting location estimator 12 and the threshold comparator 31. The communications system 11 is coupled between the threshold comparator 31 and the correlation part starting location estimator 12. Bitstream data 10 is shown in FIG. 1 being input into the correlation part starting location estimator 12.

Bitstream data 10 is received by communications system 11. Bitstream data 10 comprises X blocks of data, with each block of data comprising N bits. Bitstream data 10 in FIG. 1 is labelled BLOCK 1, BLOCK 2, ...; BLOCK J/N (where J/N represents J (total bits) divided by N (the bits per block)), etc. The block size is chosen such that the data in each block is unique.

It should be noted that the blocks used for the estimation part do not necessarily have to "line up" with the beginning of the expected pattern. For example, if the first several bits in bitstream data 10 are in error, the first block that is used to predict the correlation part (BLOCK 1) might actually begin on the fourth bit of the expected pattern.

In the preferred embodiment of the invention, the 320-bit pattern that is searched for is broken into 8-bit blocks (N=8), with an estimation part of 256 bits (J=256) and a correlation part of 64 bits (K=64). Therefore, the estimation part consists of blocks 1 through 32 (J/N=32) and the correlation part consists of BLOCKS 33 through 40.

As bitstream data 10 is received, BLOCK 1 data is transferred from bitstream data 10 to the correlation part starting location estimator 12. Similarly, BLOCK 2 data, BLOCK 3 data, etc. is transferred to the correlation part starting location estimator 12 as it is received by communications system 11 as bitstream data 10. As shown in FIG. 1, BLOCK 1 data is transferred to the correlation part starting location estimator 12 via input 14. BLOCK 2 data is transferred to the correlation part starting location estimator 12 via input 16. BLOCK J/N data is transferred to the correlation part starting location estimator 12 via input 18. Inputs 14, 16, and 18 can be serial or parallel busses.

The correlation part starting location estimator 12 checks each incoming estimation block of the bitstream data 10 as it is received. The correlation part starting location estimator 12 uses an estimation correlation table 13 to predict the location in the received bitstream data 10 of the first correlation block. The correlation table 13 can be implemented with a simple look-up table. Thus, for a given received byte of bitstream data 10, estimation correlation table 13 indicates to the correlation part starting location estimator 12 the number of blocks until the first correlation block in the received bitstream data 10. This information constitutes a first predicted starting location of the first correlation block in the bitstream data 10.

Since the correlation part starting location estimator 12 checks each incoming estimation block of the bitstream data 10 as it is received, successive predictions of the starting location 20 can be compared for consistency. A minimum number of consistent predictions of the start of the correlation part can be set before the starting location 20 is considered to be confirmed. In this preferred embodiment, three consecutive consistent predictions of the location of the first correlation block are required before the fast pattern correlator considers the starting location 20 verified.

If one or two consecutive estimation part blocks point to a predicted starting location, and the next estimation block points to a different predicted starting location, that last predicted starting location is used as a first prediction in checking subsequent estimation part blocks. For example, if two consecutive predictions of the starting location of the first correlation block are "31 blocks to go", followed by "30 blocks to go", and the next prediction is "15 blocks to go", the "15 blocks to go" prediction is counted as the first of a possible 3-prediction confirmation of the new predicted starting location. Thus, in this example, the correlation part starting location estimator 12 would need to verify "14 blocks to go" followed by a prediction of "13 blocks to go" to confirm starting location 20.

If, however, the "31 blocks to go" and the "30 blocks to go" predictions are accurate and the "15 blocks to go" prediction is due to a noise-induced error, there are 26 additional chances for the correlation part starting location estimator 12 to verify the correct starting location 20 as the correlation part starting location estimator 12 can perform estimation correlations for all the estimation part blocks of bitstream data 10. Any time there is a failure to match estimation part data, either due to a non-matching block or noise in the incoming bitstream data 10 mimicking a non-matching block, the correlation part starting location estimator simply keeps checking blocks as they are received, in what essentially is a "start over" mode.

Once the minimum number of consistent consecutive predictions of the first correlation block location have been verified (i.e., the fast pattern correlator has confirmed the starting location 20 to the certainty desired), there is a simple countdown of blocks to the first correlation block. The starting location 20 is communicated to the correlator 22, as shown in FIG. 1, and the correlator 22 receives the correlation part of bitstream data 10 as shown by input 24 in FIG. 1. Input 24 can be serial or a parallel bus.

Correlator 22 uses inputs from exclusive-OR function 23 and bit-error table 25. Expected pattern 28 is transferred to correlator 22, to be compared with the blocks from the correlation part of the bitstream data 10. The blocks from the correlation part of bitstream data 10 are exclusive-ORed with the expected pattern 28, and the result used with the bit-error table 25 to determine the number of bit errors in the received pattern.

As an example for this embodiment, assume 01 01 10 11 is a received pattern and 01 01 01 01 is an expected (true) pattern. Logically exclusive-ORing the received pattern and the true pattern produces the result 00 00 11 10 which is indexed in the bit-error table 25 to 3 bit errors.

The number of bit errors 30 is output from the correlator 22 to the threshold comparator 31. If the number of bit errors 30 exceeds a predetermined threshold number, the threshold comparator 31, via output 33, indicates to the communications system 11 that the fast pattern correlator should continue to evaluate incoming bitstream data 10. The fast pattern correlator effectively continues the search for a pattern which correlates to the expected pattern. Conversely, if the number of bit errors does not exceed the threshold, the threshold comparator via output 33 indicates to the communications system 11 that the incoming data correlated to the expected pattern. The threshold number can be determined based on a number of factors, including how many noise-induced errors the received bitstream data 10 may contain.

The major components in the fast pattern correlator can be accomplished in either hardware or software. Correlation computer 35, indicated by the dashed line on FIG. 1, represents an embodiment in which a correlation computer 35 executes the functions of the fast pattern correlator and method in software, comprising the correlation part starting location estimator 12, estimation correlation table 13, correlator 22, exclusive-OR function 23, bit-error table 25, expected pattern 28, and threshold comparator 31.

Figure 2:
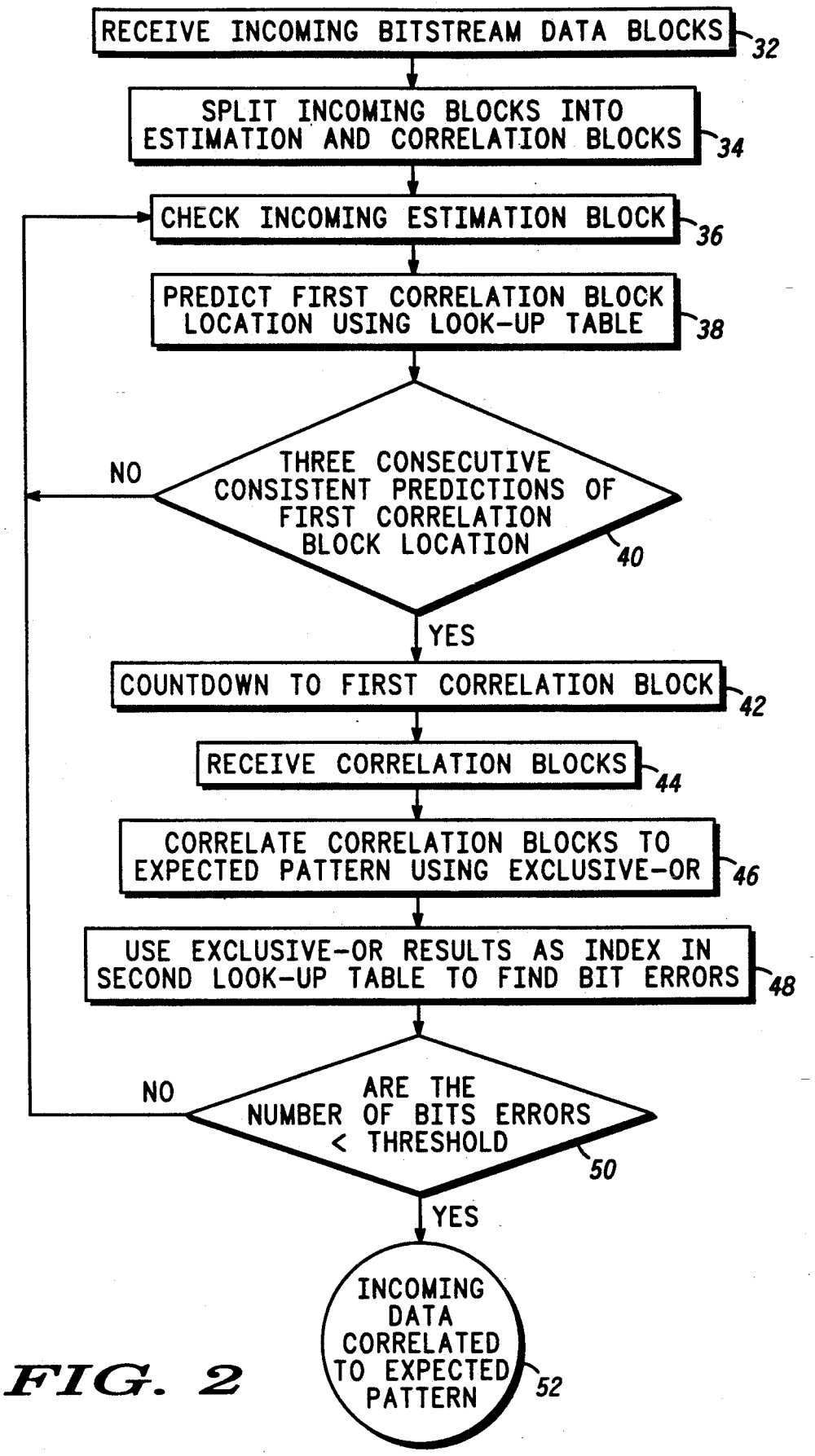
In FIG. 2, there is shown a flow chart of a fast pattern correlation method used in the fast pattern correlation system of FIG. 1.

FIG. 2 shows a flow chart of a fast pattern correlation method used in the fast pattern correlation system of FIG. 1. Box 32 illustrates the step of receiving the incoming bitstream data blocks into the fast pattern correlation and/or communications system. The received data is split into incoming blocks representing an estimation part and a correlation part, as shown in box 34. The first incoming estimation block, as shown in box 36, is used to predict the location at which the first correlation block begins. A look-up table, as illustrated in box 38, provides the predicted starting location.

Consecutive, consistent predicted starting locations for the first correlation block are required prior to commencing actual correlation of the received pattern with the expected (true) pattern. As shown in box 40, this embodiment requires three such consecutive, consistent predictions to consider the starting location of the correlation block verified. If three consecutive, consistent predictions are not made, the fast pattern correlation system checks the next incoming blocks, effectively "starting over" in searching for the appropriate pattern by transferring control to box 36 via the NO path.

If three consecutive, consistent predictions of the first correlation block are in fact made, box 40 transfers control to box 42 via the YES path and there is a countdown to the first correlation block of data, as shown in box 42. After the countdown, the correlation blocks are received, as shown in box 44, and the correlation blocks are correlated to the expected pattern using an exclusive-OR function, as shown in box 46. Box 48 shows that the exclusive-OR results are used as an index in a second look-up type table to find the number of bit errors between the received data and the expected pattern.

If the number of bit errors in the received correlation blocks compared with the expected pattern exceed a predetermined threshold, as shown in box 50, the fast pattern correlation system transfers control to box 36 via the NO path and checks the next incoming estimation block. If, however, the number of bit errors does not exceed the threshold, box 50 transfers control to box 52 via the YES path and the incoming data is considered to be correlated to the expected pattern, as shown in box 52.

Figure 3:
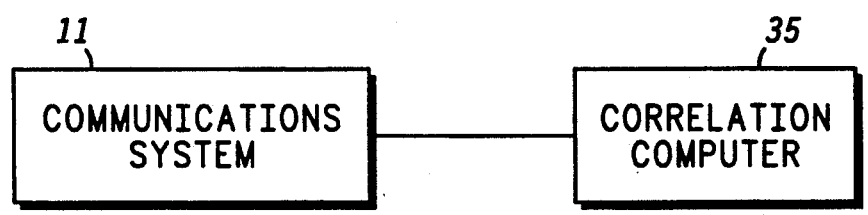
In FIG. 3 there is shown a schematic of the correlation computer coupled to the communications system in accordance with FIGS. 1 and 2.

FIG. 3 illustrates the coupling of the communications system 11 and the correlation computer 35. The correlation computer 35 can be used to perform the functions of some or all of the functions of the fast pattern correlator and method in software. The communications system can comprise a telephone, facsimile machine, radio telephone, or any telecommunication equipment.

Thus, as has been described, a fast pattern correlator and method which overcomes specific problems and accomplishes certain advantages relative to prior art methods and mechanisms. The improvements are significant. The fast pattern correlator and method do not require a large number of components in hardware. The fast pattern correlator and method also require a correlation of only a portion of an entire data bitstream pattern, thereby speeding up the correlation process. The fast pattern correlator and method are well suited for software implementations in bit lengths which a processor can handle efficiently (e.g., 8-bit, 16-bit, or 32-bit pieces). The fast pattern correlator and method will also successfully correlate a pattern even in the presence of bit errors.

Thus, there has also been provided, in accordance with an embodiment of the invention, a fast pattern correlator and method which overcomes specific problems and accomplishes certain advantages and which fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A fast pattern correlator for correlating bitstream data to an expected pattern comprising:
   communications systems means for receiving the bitstream data in an estimation part and a correlation part;
   correlation part starting location estimator means coupled to the communications systems means, the correlation part starting location estimator means for determining a starting location for the correlation part based on positions of unique blocks of the bitstream data in the estimation part;
   correlator means coupled to the correlation part starting location estimator means and to the communications systems means, the correlator means for receiving the starting location from the correlation part starting location estimator means, for receiving the correlation part of the bitstream data from the communications means, and for receiving an expected pattern and producing a bit error number from the correlation part and the expected pattern; and
   threshold comparator means coupled to the correlator means and to the communications systems means, the threshold comparator means for receiving the bit error number from the correlator means and producing an output to the communications system means.

2. A fast pattern correlator as claimed in claim 1 wherein the correlation part starting location estimator means comprises estimation part correlation table means coupled to the correlator means, the estimation part correlation table means for predicting the starting location for the correlation part using the estimation part, based on the positions of the unique blocks of the bitstream data.

3. A fast pattern correlator as claimed in claim 2 wherein the correlator means comprises:
   exclusive-OR means coupled to the estimation part correlation table means, the exclusive-OR means for exclusive-ORing the correlation part and the expected pattern; and
   bit error table means coupled to the exclusive-OR means and coupled to the threshold comparator means, the bit error table means for producing the bit error number from the correlation part and the expected pattern.

4. A method for fast correlation of bitstream data comprising the steps of:
   receiving a plurality of bitstream data blocks containing the bitstream data;
   splitting the plurality of bitstream data blocks into a plurality of consecutive estimation blocks and a plurality of correlation blocks;
   determining a starting location for the plurality of correlation blocks based on positions of unique bitstream data blocks within the plurality of bitstream data blocks in the plurality of consecutive estimation blocks;
   extracting the plurality of correlation blocks from the plurality of bitstream data blocks;
   comparing the plurality of correlation blocks to an expected pattern; and
   generating a number of bit errors between the plurality of correlation blocks and the expected pattern.

5. A method for fast correlation of bitstream data as claimed in claim 4, wherein the step determining a starting location for the plurality of correlation blocks comprises the steps of:
  indexing an estimation block from the plurality of consecutive estimation blocks in an estimation part correlation table; and
  predicting a correlation block location from the estimation part correlation table.

6. A method for fast correlation of bitstream data as claimed in claim 5, wherein the steps of indexing and predicting are repeated for the plurality of consecutive estimation blocks until a minimum number of consistent correlation block locations have been predicted.

7. A method for fast correlation of bitstream data as claimed in claim 6, wherein the step of extracting the plurality of correlation blocks further comprises the step of counting through the plurality of consecutive estimation blocks to the plurality of correlation blocks.

8. A method for fast correlation of bitstream data as claimed in claim 4, wherein the step of comparing the plurality of correlation blocks to an expected pattern comprises the steps of:
  exclusive-ORing the plurality of correlation blocks and the expected pattern to produce an exclusive-OR result; and
  indexing the exclusive-OR result in a bit-error table to find a number of bit errors.

9. A method for fast correlation of bitstream data as claimed in claim 8, further comprising the step of verifying that the number of bit errors is less than a predetermined value.

10. A method for fast correlation of bitstream data in a communications system comprising the steps of:
  defining a plurality of bitstream data blocks containing the bitstream data such that the bitstream data in each bitstream data block is unique;
  receiving the plurality of bitstream data blocks;
  splitting the plurality of bitstream data blocks into a plurality of consecutive estimation blocks and a plurality of correlation blocks;
  determining a starting location for the plurality of correlation blocks based on positions of the bitstream data blocks;
  extracting the plurality of correlation blocks from the plurality of bitstream data blocks;
  comparing the plurality of correlation blocks to an expected pattern;
  generating a number of bit errors between the plurality of correlation blocks and the expected pattern; and
  communicating the number of bit errors to the communications system.

11. A method for fast correlation of bitstream data in a communications system as claimed in claim 10, wherein the step of determining comprises the steps of:
  indexing an estimation block from the plurality of consecutive estimation blocks in an estimation part correlation table; and
  predicting a correlation block location from the estimation part correlation table.

12. A method for fast correlation of bitstream data in a communications system as claimed in claim 11, wherein the steps of indexing and predicting are repeated for the plurality of consecutive estimation blocks until a minimum number of consistent correlation block locations have been predicted.

13. A method for fast correlation of bitstream data in a communications system as claimed in claim 12, wherein the step of extracting the plurality of correlation blocks further comprises counting through the plurality of consecutive estimation blocks to the plurality of correlation blocks.

14. A method for fast correlation of bitstream data as claimed in claim 10, wherein the step of comparing the plurality of correlation blocks to an expected pattern comprises the steps of:
  exclusive-ORing the plurality of correlation blocks and the expected pattern to produce an exclusive-OR result; and
  indexing the exclusive-OR result in a bit-error table to find a number of bit errors.

15. A method for fast correlation of bitstream data as claimed in claim 14, further comprising the step of verifying that the number of bit errors is less than a predetermined value.

16. A correlator for comparing data to an expected pattern comprising:
  means for receiving the data in an estimation part and a correlation part;
  estimator means coupled to the means for receiving the data, the estimator means for determining a starting location for the correlation part based on positions of unique blocks of data;
  correlator means coupled to the estimator means and to the means for receiving the data, the correlator means for receiving the starting location from the estimator means, for receiving the correlation part of the data from the means for receiving the data, and for receiving an expected pattern and producing a bit error count between the correlation part and the expected pattern; and
  threshold comparator means coupled to the correlator means and to the means for receiving the data, the threshold comparator means for receiving the bit error count from the correlator means and producing an output.

17. A fast pattern correlator as claimed in claim 16 wherein the estimator means comprises estimation part correlation table means coupled to the correlator means, the estimation part correlation table means for predicting the starting location for the correlation part using the estimation part based on the positions of the unique blocks of data.

18. A fast pattern correlator as claimed in claim 17 wherein the correlator means comprises:
  exclusive-OR means coupled to the estimation part correlation table means, the exclusive-OR means for exclusive-ORing the correlation part and the expected pattern; and
  bit error table means coupled to the exclusive-OR means and coupled to the threshold comparator means, the bit error table means for producing the bit error count between the correlation part and the expected pattern.

* * * * *